United States Patent
Chen et al.

(10) Patent No.: US 10,684,778 B2
(45) Date of Patent: Jun. 16, 2020

(54) DATA UPDATING IN NON-VOLATILE MEMORY

(71) Applicant: Seagate Technology LLC, Scotts Valley, CA (US)

(72) Inventors: Yiran Chen, Eden Prairie, MN (US); Hai Li, Eden Prairie, MN (US); Wenzhong Zhu, Apple Valley, MN (US); Xiaobin Wang, Chanhassen, MN (US); Yuan Yan, San Jose, CA (US); Harry Hongyue Liu, Maple Grove, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 139 days.

(21) Appl. No.: 14/846,411

(22) Filed: Sep. 4, 2015

(65) Prior Publication Data

US 2015/0378607 A1 Dec. 31, 2015

Related U.S. Application Data

(63) Continuation of application No. 12/482,693, filed on Jun. 11, 2009, now Pat. No. 9,128,821.

(60) Provisional application No. 61/104,406, filed on Oct. 10, 2008.

(51) Int. Cl.
*G06F 3/06* (2006.01)
*G06F 12/02* (2006.01)

(52) U.S. Cl.
CPC ............ *G06F 3/061* (2013.01); *G06F 3/0655* (2013.01); *G06F 3/0688* (2013.01); *G06F 12/0246* (2013.01); *G06F 2212/205* (2013.01); *G06F 2212/2024* (2013.01); *G06F 2212/225* (2013.01); *G06F 2212/7202* (2013.01); *Y02D 10/13* (2018.01)

(58) Field of Classification Search
CPC ......... G06F 12/0246; G06F 2212/7203; G06F 2212/2024
See application file for complete search history.

(56) References Cited

U.S. PATENT DOCUMENTS

| | | | |
|---|---|---|---|
| 6,014,674 A | 1/2000 | McCargar | |
| 6,931,480 B2 | 8/2005 | Swamiinathan | |
| 7,325,090 B2 | 1/2008 | Ronen | |
| 9,128,821 B2 * | 9/2015 | Chen | G06F 12/0246 |
| 2003/0046487 A1 | 3/2003 | Swaminathan | |

(Continued)

OTHER PUBLICATIONS

"Prototype 2 Mbit Non-Volatile RAM Chip Employing Spin-Transfer Torque writing method", Hitachi, Feb. 13, 2007.*

(Continued)

*Primary Examiner* — Edward J Dudek, Jr.
(74) *Attorney, Agent, or Firm* — Hall Estill Attorneys at Law (57) ABSTRACT

Various embodiments of the present invention are generally directed to an apparatus and associated method for updating data in a non-volatile memory array. In accordance with some embodiments, a memory block is formed with a plurality of types of memory cell sectors arranged in data pages of a first type and log pages of a second type that can be updated in-place. A first updated sector is written to a first log page while maintaining an outdated sector in an original data page, and overwritten with a second updated sector.

20 Claims, 5 Drawing Sheets

(56) References Cited

U.S. PATENT DOCUMENTS

| | | |
|---|---|---|
| 2004/0083335 A1* | 4/2004 | Gonzalez ............ G06F 12/0246 |
| | | 711/103 |
| 2004/0117586 A1 | 6/2004 | Estakhri et al. |
| 2007/0214309 A1* | 9/2007 | Matsuura ............ G06F 12/0246 |
| | | 711/103 |
| 2008/0104309 A1* | 5/2008 | Cheon ................. G06F 12/0246 |
| | | 711/103 |
| 2008/0189490 A1 | 8/2008 | Cheon et al. |
| 2009/0031098 A1 | 1/2009 | Sartore |
| 2009/0106513 A1* | 4/2009 | Cheng ................. G06F 11/1068 |
| | | 711/162 |
| 2009/0198873 A1 | 8/2009 | Tzeng |
| 2010/0088460 A1 | 4/2010 | Jeddeloh |
| 2011/0219180 A1* | 9/2011 | Cheon ................. G06F 12/0246 |
| | | 711/103 |
| 2013/0013861 A1 | 1/2013 | Cornwell et al. |

OTHER PUBLICATIONS

Peter Clarke, "Resistive RAM sets chip companies racing", Apr. 24, 2006.*

San-Won Lee and Bongki Moon, "Design of Flash-Based DBMS: An In-Page Logging Approach," SIGMOD '07, Jun. 11-14, 2007, pp. 1-12, Beijing, China.

* cited by examiner

DATA UPDATING IN NON-VOLATILE MEMORY

RELATED APPLICATIONS

This application is a continuation of U.S. patent application Ser. No. 12/482,693 filed Jun. 11, 2009 which issues as U.S. Pat. No. 9,128,821 on Sep. 8, 2015 and which makes a claim of domestic priority under 35 U.S.C. § 119(e) to U.S. Provisional Patent Application No. 61/104,406 filed Oct. 10, 2008.

BACKGROUND

Data storage devices generally operate to store and retrieve data in a fast and efficient manner. Some storage devices utilize a semiconductor array of solid-state memory cells to store individual bits of data. Such memory cells can be volatile (e.g., DRAM, SRAM) or non-volatile (RRAM, STRAM, flash, etc.). Flash memory has been used, but suffers from inefficiencies such as, but not limited to, in-place updating.

As will be appreciated, volatile memory cells generally retain data stored in memory only so long as operational power continues to be supplied to the device, while non-volatile memory cells generally retain data storage in memory even in the absence of the application of operational power.

As such, in these and other types of data storage devices it is often desirable to increase efficiency and speed, particularly by improving log page utilization to improve traffic and energy consumption.

SUMMARY

Various embodiments of the present invention are generally directed to an apparatus and associated method for updating data in a non-volatile memory array.

In accordance with some embodiments, a memory block is formed with a plurality of types of memory cell sectors arranged in data pages of a first type and log pages of a second type that can be updated in-place. A first updated sector is written to a first log page while maintaining an outdated sector in an original data page, and overwritten with a second updated sector.

In accordance with other embodiments, a memory block has a plurality of types of memory cell sectors arranged in data pages of a first type and log pages of a second type that can be individually overwritten. A first log page is written with a first updated sector while an outdated sector is maintained in an original data page. The first data page is subsequently overwritten with a second updated sector.

These and various other features and advantages which characterize the various embodiments of the present invention can be understood in view of the following detailed discussion in view of the accompanying drawings.

DETAILED DESCRIPTION

Figure 1:
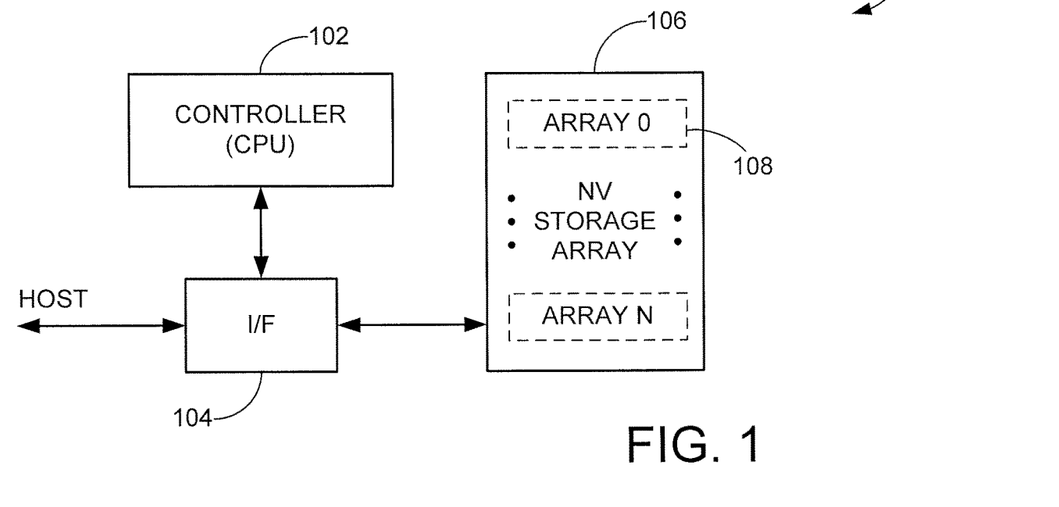
FIG. 1 provides a functional block representation of a data storage device in accordance with various embodiments of the present invention.

FIG. 1 provides a functional block representation of a data storage device 100 constructed and operated in accordance with various embodiments of the present invention. Top level control of the device 100 is carried out by a suitable controller 102, which may be a programmable or hardware based microcontroller. The controller 102 communicates with a host device via a controller interface (I/F) circuit 104. A memory space is shown at 106 to comprise a number of memory arrays 108 (denoted Array 0-N), although it will be appreciated that a single array can be utilized as desired. Each array 108 comprises a block of semiconductor memory of selected storage capacity. Communications between the controller 102 and the memory space 106 are coordinated via the I/F 104.

It can be appreciated that the memory space 106 can be configured in various different ways with a variety of write and read circuitry. One such configuration can be as an array of sectors of memory cells 110 arranged in pages and block, as displayed in FIG. 2. A plurality of sectors of memory cells 112 can be oriented either physically or logically to correspond to a particular block 114 and page 116 of memory. As such, accessing the particular block and page in which the sector is oriented can facilitate access to or from data stored in a selected sector of memory.

Figure 2:
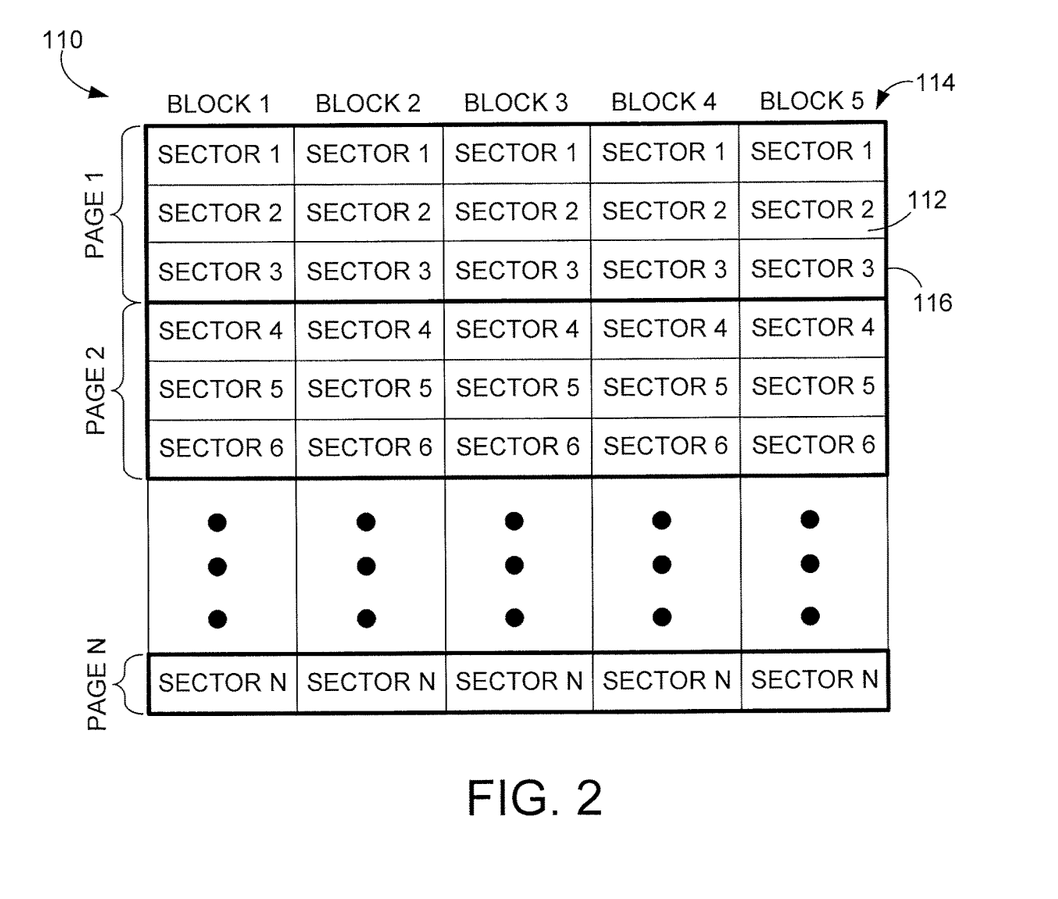
FIG. 2 sets forth a generalized representation of a non-volatile memory array of the exemplary device of FIG. 1.

However, it should be noted that numerous different configurations of sectors of memory are possible and the orientation shown in FIG. 2 is not limiting. Furthermore, the size of a memory array 110 is not restricted and can be constructed with as many sectors, blocks, and pages as desired.

Figure 3:
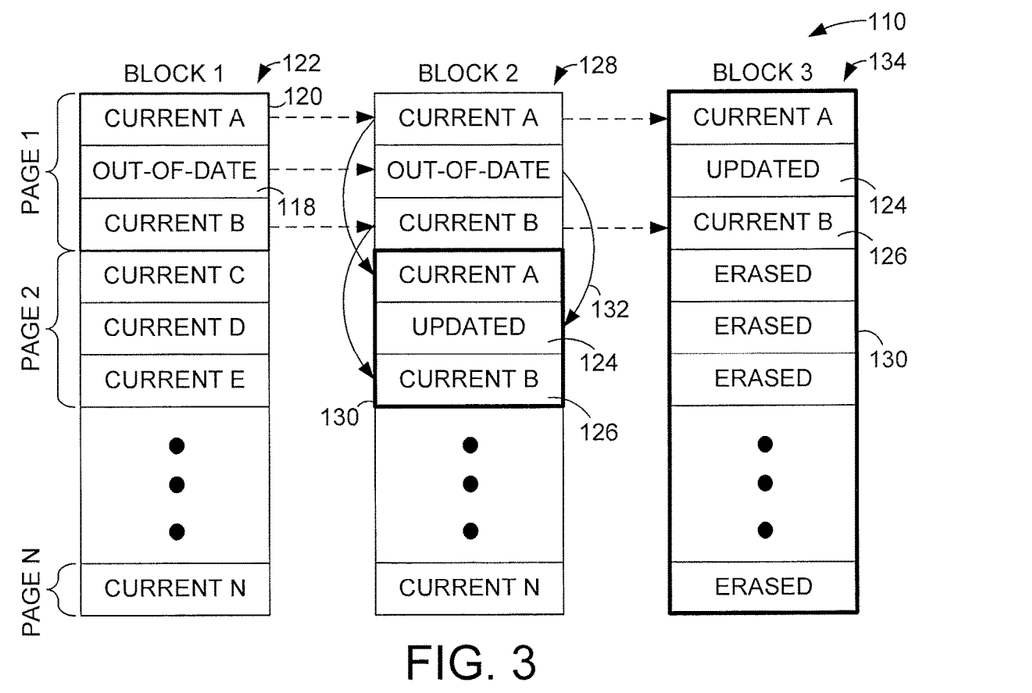
FIG. 3 generally illustrates an exemplary operation of the non-volatile memory array of FIG. 2.

FIG. 3 generally illustrates an exemplary operation of a portion of the memory array 110 of FIG. 2. As shown, a selected sector of memory 118 is located in a corresponding page and block of memory 120 and 122. As various operations are conducted, the data stored in the selected sector of memory 118 can become out-of-date and need replacing with an updated sector of memory 124. It should be noted that one or many sectors 118 of the page of memory 120 can be out-of-date simultaneously. However, many types of memory do not allow in-place updating of data. That is, no data item can be updated in place by overwriting the single sector of memory 118.

As a result, an update can require a time consuming erase operation and a subsequent writing of the page of memory 120, including both selected sectors 118 and non-selected sectors 126. In some embodiments, a second block of memory 128 is used to write the updated sector of memory 124 in a newly erased page 130 while tagging the out-of-date sector 118 with a forward pointer 132 to the updated sector 124. Occasionally, a block of memory 128 can be full of stored data to which no newly erased page is present and the updated sector of memory 124 is written to the next available block of memory 134 having an erased page 130.

Further, not having an ability to selectively overwrite the selected sector of memory 118 with the updated sector 124 can present enhanced degradation of memory cells due to increased erase and write operations for non-selected sectors 126. It can readily be appreciated that an updating algorithm such as the one displayed in FIG. 3 can be very inefficient in both time and space allocation. It should be noted that the various operations displayed in FIG. 3 are exemplary and do not limit the possible updating configurations for blocks of non-volatile memory.

Accordingly, a block of memory sectors that can be updated in-place by writing and overwriting to a specified log page of memory sectors provides advantageous operation with enhanced efficiency and performance. Such in-place updating can be facilitated with a physical or logical partition of a block of memory into data storing pages and log storing pages with one or more types of memory. Thus, any updates needed throughout the operation of a block of memory can have a designated region of log pages dedicated to storing updated data from out-of-date sectors in the data storing pages.

Figure 4:
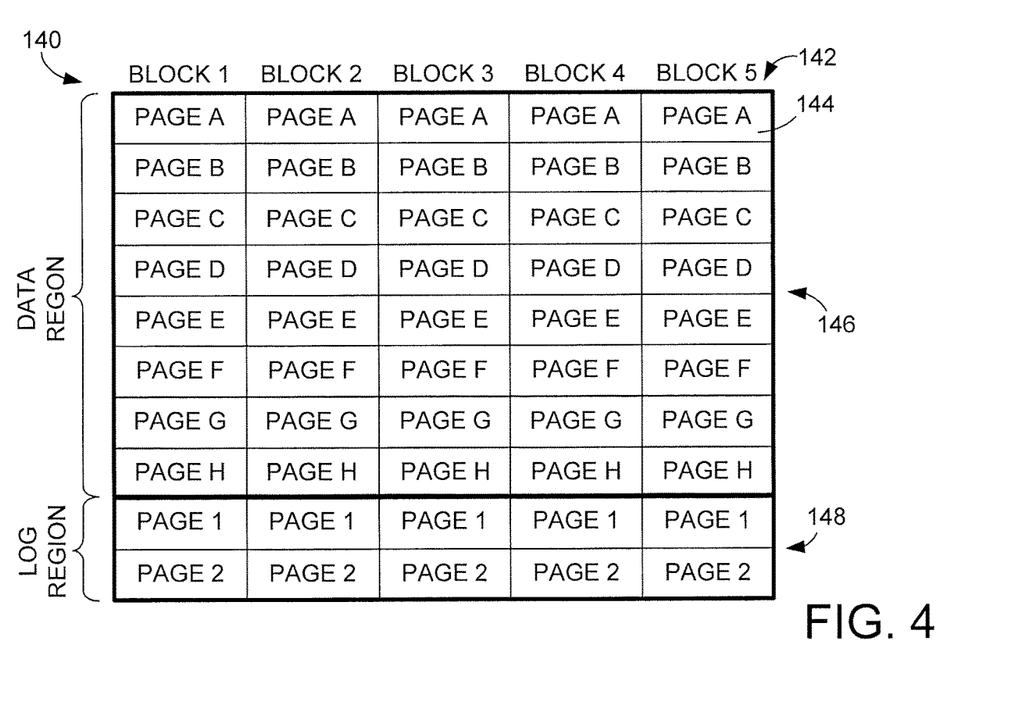
FIG. 4 depicts an array of memory sectors constructed in accordance with various embodiments of the present invention.

An exemplary array of memory sectors 140 capable arranged into data storing pages and log storing pages is generally provided in FIG. 4. The array of memory sectors 140 is shown arranged into a number of different blocks 142 and pages 144. While the separation of sectors into pages and blocks is not required, such configuration allows access to a precise number of sectors without involving a large amount of processing overhead. Similarly, the data region 146 is displayed with numerous blocks 142 of memory that is not limiting to the possible orientations of the array 140, but that provide a uniform region to which data can be written.

In addition, a plurality of pages of memory is provided for each block of memory 142 that correspond to a log region 148. The pages oriented in the log region 148 can present various operational characteristics including, but not limited to, exclusive storage of updated sectors of memory from existing out-of-date sectors present in the data region 146 of the same block of memory 142. As such, the data pages can consist of a first type of memory while the log pages consist of a second type of memory to allow enhanced efficiency in updating memory sectors of the data region 146.

Figure 5:
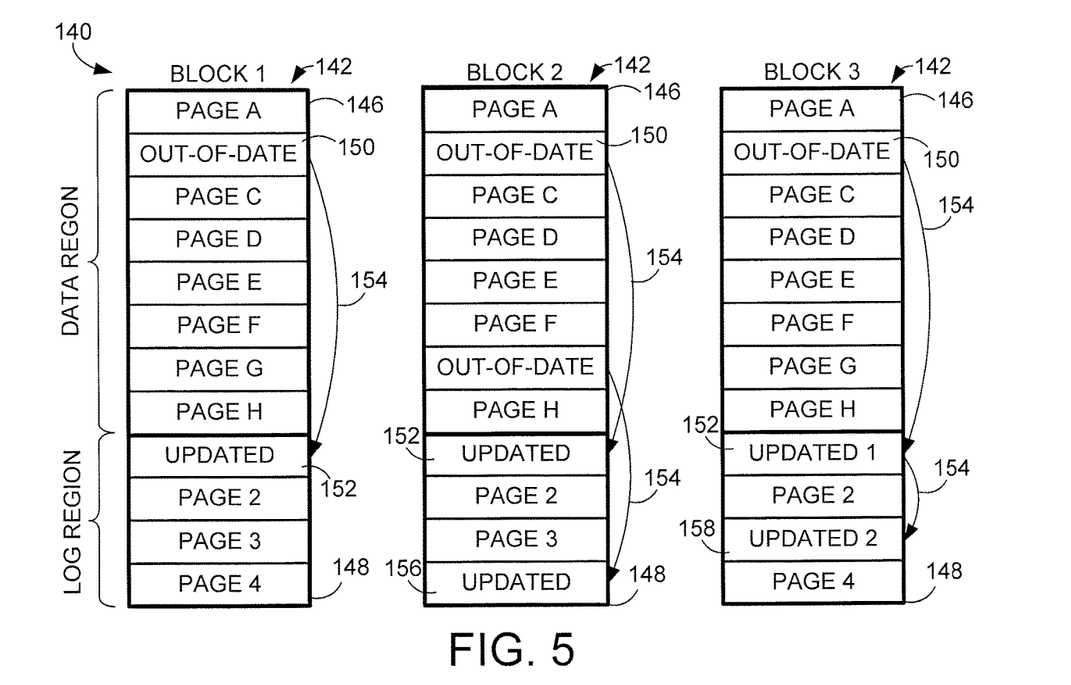
FIG. 5 generally illustrates an exemplary operation of the array of memory sectors of FIG. 4.

One such updating operation of the array of memory sectors 140 of FIG. 4 is provided in FIG. 5. As shown in block 1, when a data sector 150 present in the data region 146 and assigned to data storage becomes out-of-date, an updated sector 152 is written in the log region 148 while a forward pointer 154 directs access to the updated sector 152. Alternatively in block 2, multiple out-of-date sectors 150 can be written to independent updated sectors 152 and 156 of the log region 148. In yet another alternative updating operation, an out-of-date sector 150 of block 3 is written to a first updated sector 152 and subsequently to a second updated sector 158 within the log region 148.

Figure 6:
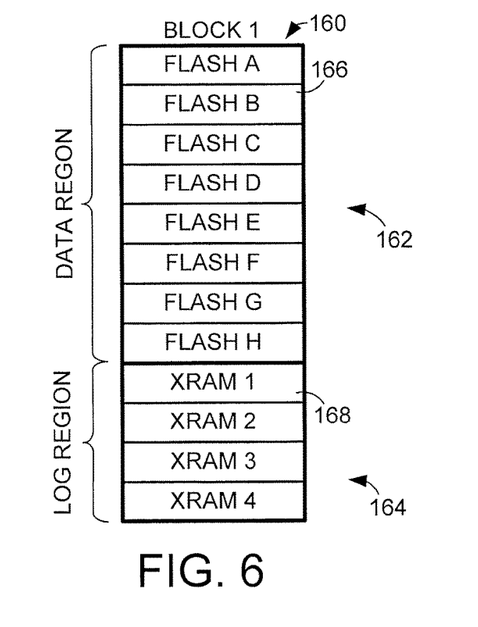
FIG. 6 displays an exemplary block of memory sectors constructed in accordance with various embodiments of the present invention.

FIG. 6 shows a block of memory 160 constructed in accordance with various embodiments of the present invention. A block of memory sectors are arranged into a data region 162 and a log region 164, as displayed in FIGS. 4-5. The data sectors 166 corresponding to an orientation in the data region 162 and data storage are configured with a first type of memory, such as flash memory. Meanwhile, the log sectors 168 present in the log region 164 and assigned to the storage of updated sectors that correspond to data sectors 166 are a second type of memory such as XRAM.

For clarification, the use of a flash memory is not limited and the data sectors 156 can be a variety of memory including, but not limited to, EEPROM and NAND. Furthermore, the possible XRAM memory used in log sectors 158 can be various memory technologies that allow individual overwriting of cells such as, but not limited to, spin torque random access memory (STRAM) and resistive random access memory (RRAM). It should further be noted that the numerous types of memory can be included in either the data region 152 or the log region 154. That is, a portion of the data region 152 can be constructed with flash memory cells while the remaining portion consists of EEPROM memory cells. Similarly, the log region 154 can consist of both RRAM and STRAM memory while keeping with the spirit of the present invention.

Figure 7:
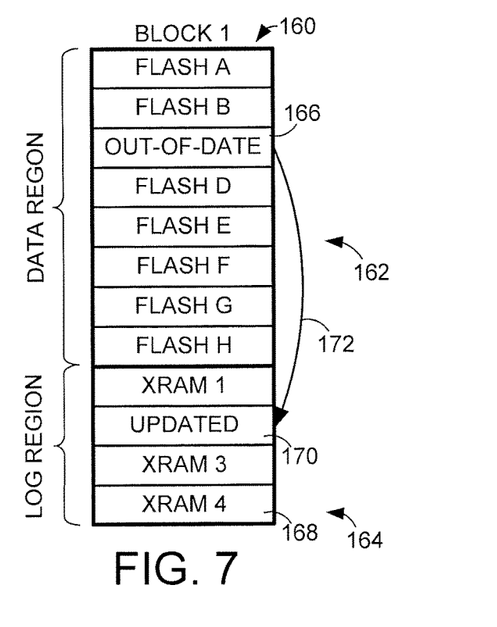
FIG. 7 generally illustrates an exemplary operation of the block of memory sectors of FIG. 6.

An exemplary operation of the block of memory 150 of FIG. 6 is displayed in FIG. 7 in accordance with various embodiments of the present invention. As a data sector 166 becomes out-of-date, a log sector 168 is written with an updated sector 170 and accessed via a forward pointer 172 from the out-of-date sector 166. It should be noted that the writing of the updated sector 170 does not require a prior erase operation due to the operational characteristics of XRAM that allows overwriting of existing data.

Consequently, a single write operation can be conducted on an individual log page without a prior erase operation to update a page of memory. Such operation provides the ability to utilize the high bandwidth and data throughput of flash type memory with the in-place overwriting capability of XRAM to advantageously decrease erroneous writing of non-updated sectors. Similarly, efficiency of the block of memory can be greatly improved due to the elimination of an erase operation prior to writing an updated sector.

Figure 8:
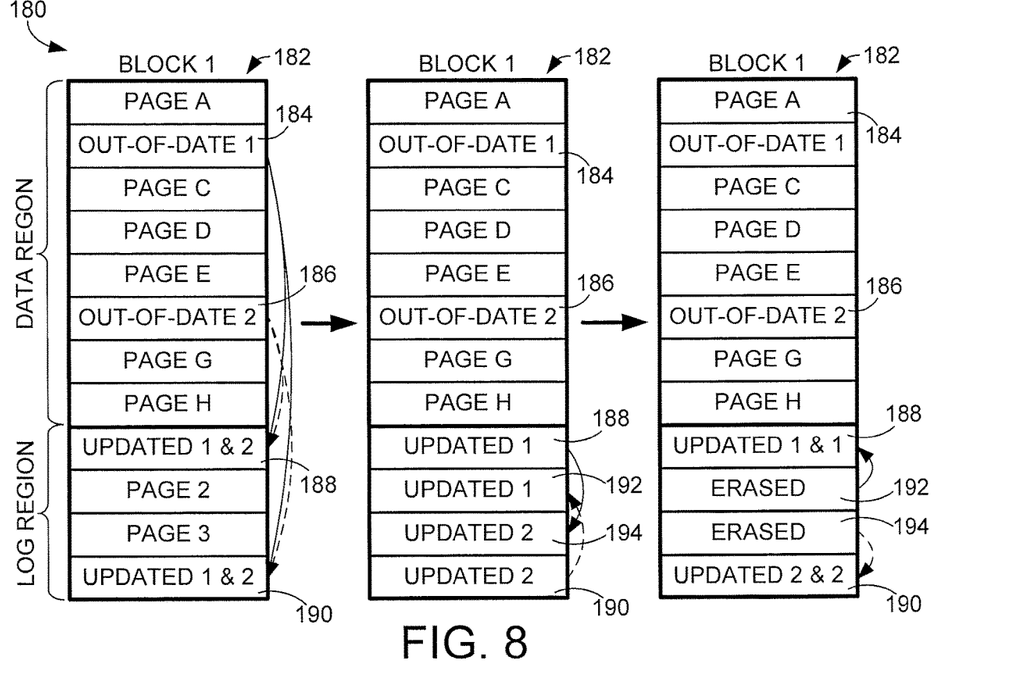
FIG. 8 sets forth an exemplary updating scheme performed on the block of memory sectors of FIG. 6.

In FIG. 8, an exemplary updating scheme 180 is generally illustrated in accordance with various embodiments of the present invention. A block of memory sectors 182 has a first out-of-date sector 184 and a second out-of-date sector 186. As shown, an updated sector for each out-of-date sector 184 and 186 are written to a first updated page 192 and a second updated page 194. That is, the log pages 188 and 190 of the log region each have multiple available sectors to which the updated sectors for the out-of-date sectors 184 and 186 are stored. While the block of memory 182 can be loaded with the multiple different updated sectors present in each log page 188 and 190, the updating scheme 180 can proceed to manipulate the position of the dissimilar updated sectors.

The updating scheme 180 can subsequently move the dissimilar updated sectors to log pages 192 and 194 so that a single updated sector is present in each log page 188, 190, 192, and 194. It should be noted that the moving of an updated sector can be carried out with various operations that may or may not include erasing the previous location individually. Furthermore, the moving of updated sectors can be facilitated in numerous different ways that can include the writing of individual sectors or pages of sectors.

The updating scheme can 180 can subsequently conclude or proceed to further move the updated sectors to common updated pages 188 and 190 so that only updated sectors corresponding to the respective first or second out-of-date sectors 184 or 186 are present. Meanwhile in some embodiments, the log pages 192 and 194 without updated sectors are erased, either individually or simultaneously by sector or page.

Figure 9:
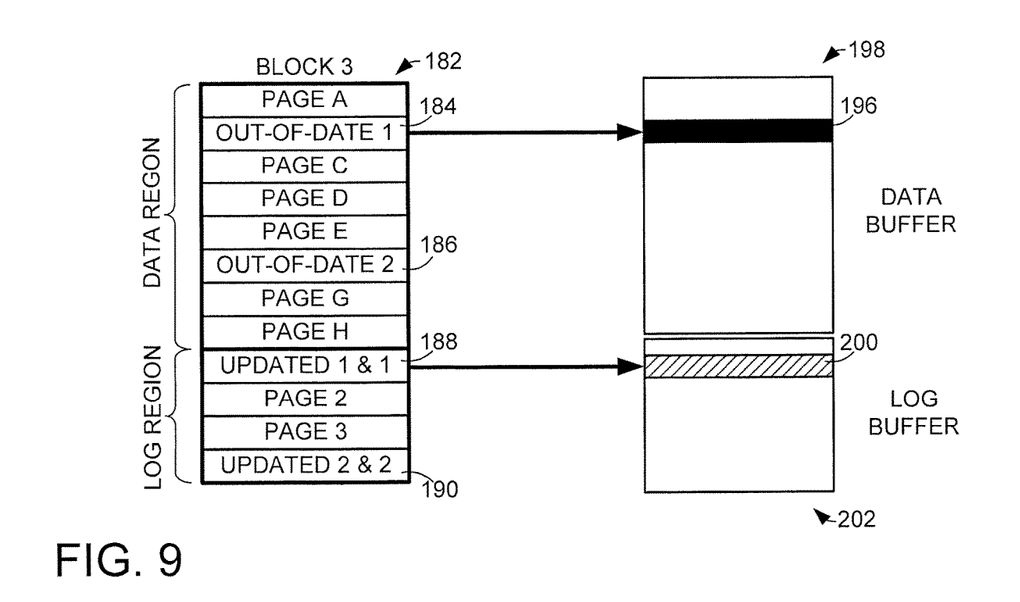
FIG. 9 displays an exemplary loading operation performed with the block of memory cells of FIG. 8.

FIG. 9 displays an operation of the block of memory 182 after the updating scheme 180 of FIG. 8. In various embodiments, data stored in a block of memory sectors 182 can be accessed by loading a selected page of data to a corresponding buffered data sector 196 located in a data buffer 198. Likewise, any updated sectors 188 can be loaded to a buffered log sector 200 in a log buffer 202. While any number and combination of pages can be loaded from either the data region or the log region, manipulating multiple updated sectors into a log page that corresponds to a data page with the updating scheme 180 allows one log page to be loaded with the data page, as shown.

Conversely, having multiple updated sectors present in a plurality of log pages can result in multiple log pages being buffered with a single data page. Hence, the updating scheme 180 of FIG. 8 can provide increased efficiency due in part to the reduction in processing overhead and buffer space needed to access data from a page of memory 184.

Figure 10:
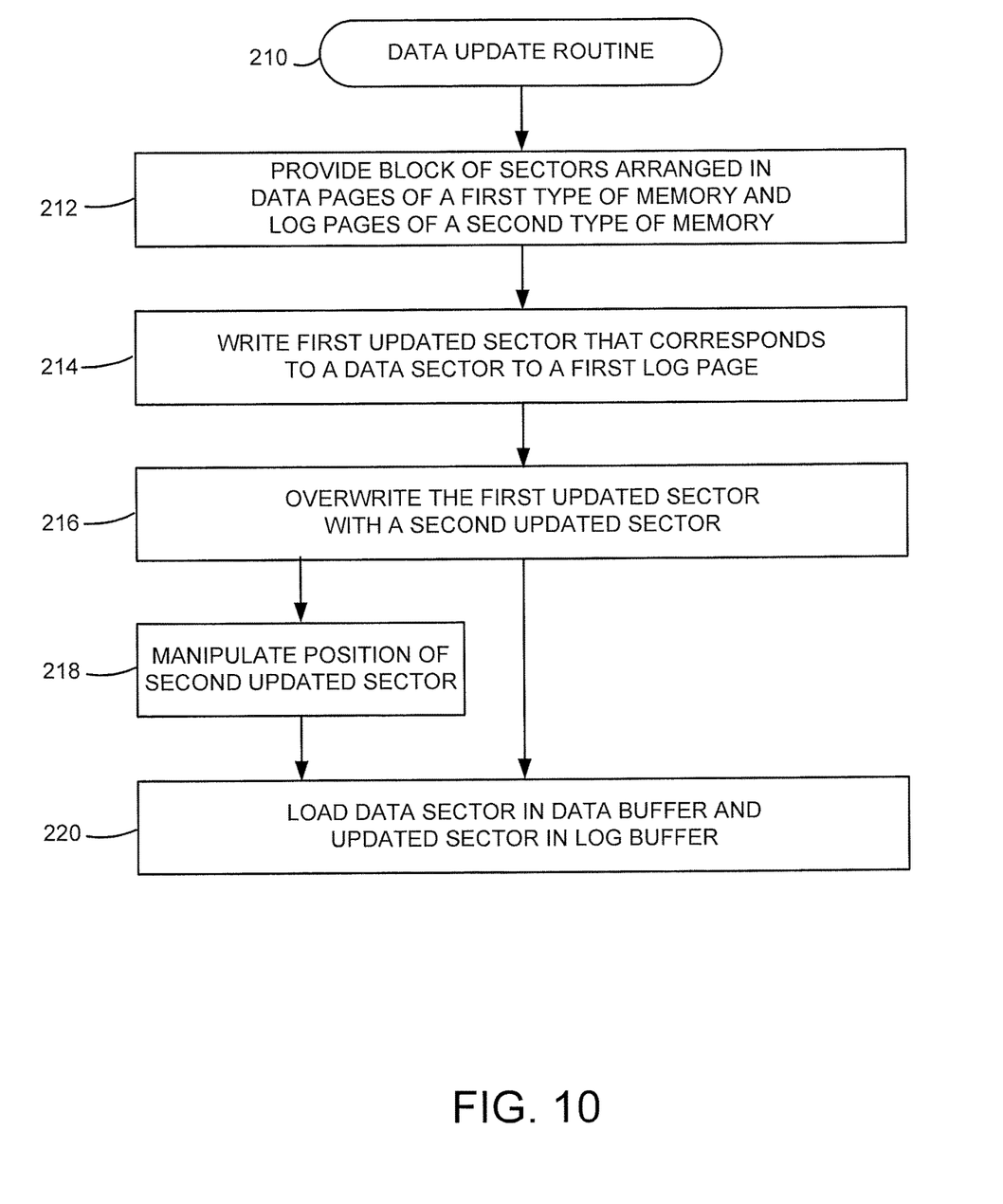
FIG. 10 provides a flowchart of an exemplary data update routine performed in accordance with various embodiments of the present invention.

FIG. 10 provides a flowchart of an exemplary data update routine 210 performed in accordance with various embodiments of the present invention. Initially in step 212, a block of sectors is provided that is arranged in data pages of a first type of memory and in log pages of a second type of memory. An updated sector that corresponds to a data sector is written in step 214 to a first log page. The first updated sector is subsequently overwritten in step 216 with a second updated sector.

At this point, the data update routine 210 can proceed to step 218 in which the position of the second updated sector is manipulated. Alternatively, step 216 can advance to step 220 in which the updated sector is loaded in a log buffer and the data sector is loaded in a data buffer. At the conclusion of step 220, the data update routine 210 can terminate or repeat any step in any order. For example, the routine 210 can proceed from step 220 to step 216 to overwrite the second updated sector with a third updated sector, as desired.

It should be noted that the second updated sector can correspond to the original data sector or a different data sector. Likewise, the various steps of the data update routine 210 can be eliminated or rearranged, as necessary, to provide efficient access to the most current data in a block of memory. Further, the data update routine 210 is not limited to the updating of a single data sector at a time. That is, multiple data sectors can be updated with different updated sectors in various log pages simultaneously in accordance with the data update routine 210.

It should also be noted that the updating of data can correspond to a single sector, page, or block of memory. For example, an out-of-date data sector can be updated by writing an updated sector to a log page just as an out-of-date data page can be updated by writing an updated log page. Hence, the configuration of sectors of memory into pages and blocks is not limited and can be oriented as desired.

It will now be appreciated that the various embodiments presented herein provide advantages over various prior art structures. A block of memory sectors arranged into data pages of a first type of memory and log pages of a second type of memory allow for the utilization of different memory technologies for the benefit of performance and efficiency. That is, a high bandwidth memory like NAND flash can be used for the data pages while an RRAM type of XRAM that can be individually overwritten can be used for the log pages. As such, the block of memory can be updated without erroneous erase operations and the redundant writing of non-updated memory cells.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising a data storage device having first and second non-volatile memory arrays, the first non-volatile memory array comprising a first type of memory that cannot be updated in-place, the second non-volatile memory array comprising a second type of memory that can be updated in-place, a first sector of the first non-volatile memory array storing at least one out-of-date version of first data, a second sector of the first non-volatile memory array storing at least one out-of-date version of second data, a first page of the second non-volatile memory array concurrently storing a current version of the first data and a current version of the second data prior to the current version of the first data being moved to a second page of the second non-volatile memory while the current version of the second data remains in the first page.

2. The apparatus of claim 1, wherein the first non-volatile memory array comprises multiple pages with each page comprising multiple sectors.

3. The apparatus of claim 1, wherein the smallest storage resolution of the first non-volatile memory array is a page and the smallest storage resolution of the second non-volatile memory array is a sector.

4. The apparatus of claim 1, wherein the first non-volatile memory array comprises flash memory.

5. The apparatus of claim 1, wherein the second non-volatile memory array comprises XRAM.

6. The apparatus of claim 1, wherein each non-volatile memory array is present in the data storage device.

7. The apparatus of claim 1, wherein the respective out-of-date versions of the first data and the second data and the current versions of the first data and the second data are concurrently stored on the respective first and second non-volatile memory arrays.

8. The apparatus of claim 1, wherein the second non-volatile memory array stores two different out-of-date versions of the second data.

9. The apparatus of claim 1, wherein the first non-volatile memory array stores two different out-of-date versions of the first data.

10. The apparatus of claim 1, wherein a data buffer is positioned in the data storage device, the data buffer being different than the second non-volatile memory array.

11. A method comprising:
  storing a current version of a first data and a current version of a second data in a first page of a first non-volatile memory array, the first non-volatile memory array comprising a first type of memory that can be updated in-place;
  storing an out-of-date version of the first data and an out-of-date version of the second data in a second non-volatile memory array, the second non-volatile memory array comprising a second type of memory that cannot be updated in-place and differs from the first type of memory; and
  moving the current version of the first data to a second page of the first non-volatile memory array while maintaining the current version of the second data in the first page of the non-volatile memory array.

12. The method of claim 11, wherein the second non-volatile memory array stores first and second out-of-date versions of the first data.

13. The method of claim 12, wherein the first non-volatile memory array stores a third out-of-date version of the first data concurrently with the current version of the first data.

14. The method of claim 13, wherein the third out-of-date version of the first data and the current version of the first data are stored in different sectors of the first non-volatile memory array.

15. The method of claim 11, wherein the second non-volatile memory array stores multiple copies of a first out-of-date version of the first data.

16. A method comprising:
storing a current version of a first data and a current version of a second data, respectively, in a first page of a first non-volatile memory array, the first non-volatile memory array comprising a first type of memory that can be updated in-place;
storing a first out-of-date version of the first data and a first out-of-date version of the second data, respectively, in a second non-volatile memory array, the second non-volatile memory array comprising a second type of memory that cannot be updated in-place and differs from the first type of memory, the first and second non-volatile memory arrays each being present in a data storage device;
moving the current version of the first data to a second page of the first non-volatile memory array while maintaining the current version of the second data in the first page of the non-volatile memory array;
consolidating the current version of the first data and a second out-of-date version of the first data previously stored in the first non-volatile memory array into a third page of the first non-volatile memory array.

17. The method of claim 16, wherein the first out-of-date version of the first data and a second out-of-date version of the second data are respectively stored on different pages of the second non-volatile memory array.

18. The method of claim 16, wherein the second out-of-date version of the first data is stored on a fourth page of the first non-volatile memory array prior to being consolidated to the third page of the first non-volatile memory array.

19. The method of claim 16, wherein the first and second out-of-date versions of the first data were previously current versions, respectively, and each stored in the first non-volatile memory array.

20. The method of claim 19, wherein the first and second out-of-date versions of the first data were stored in the second non-volatile memory array in response to the current version of the first data and the current version of the second data each becoming out-of-date.

* * * * *